(12) United States Patent
Kalapodis et al.

(10) Patent No.: US 6,191,679 B1
(45) Date of Patent: Feb. 20, 2001

(54) THERMAL SWITCH ASSEMBLY

(75) Inventors: James B. Kalapodis, Fayetteville, NC (US); William F. Quinn, Greenwich, OH (US)

(73) Assignee: Thermo-O-Disc, Incorporated, Mansfield, OH (US)

( * ) Notice: Under 35 U.S.C. 154(b), the term of this patent shall be extended for 0 days.

(21) Appl. No.: 09/184,199

(22) Filed: Nov. 2, 1998

Related U.S. Application Data

(63) Continuation-in-part of application No. 08/850,082, filed on May 2, 1997, which is a continuation-in-part of application No. 08/977,077, filed on Nov. 24, 1997.

(51) Int. Cl.[7] ............... H01H 61/00; H01H 37/32; H01M 2/00
(52) U.S. Cl. ............... 337/140; 337/14; 337/298; 337/333; 429/61
(58) Field of Search ............... 337/140, 362, 337/333, 365, 380, 372, 381, 382, 393, 112, 765, 14; 429/61, 62, 57, 66, 58, 54, 71, 122, 174

(56) References Cited

U.S. PATENT DOCUMENTS 2,497,397  2/1950  Dales .
2,743,335  4/1956  Moyer .

(List continued on next page.)

FOREIGN PATENT DOCUMENTS

| 0 689 255 A2 | 12/1995 | (EP) . | |
|---|---|---|---|
| 0689255A2 | 12/1995 | (EP) | ............... H01M/2/12 |
| 0689255 A2 | * 12/1995 | (EP) | ............... H01M/2/12 |
| 0 689 255 A3 | 3/1996 | (EP) . | |
| 0 700 109 A1 | 3/1996 | (EP) . | |
| 0 757 394 A1 | 2/1997 | (EP) . | |
| 0 773 595 A1 | 5/1997 | (EP) . | |
| 59-191273 | 10/1984 | (JP) . | |
| 59-203376 | 11/1984 | (JP) . | |
| 63-175345 | 7/1988 | (JP) . | |
| 04345724 | 12/1992 | (JP) . | |
| 08185849 | 7/1996 | (JP) . | |
| 08236102 | 9/1996 | (JP) . | |

OTHER PUBLICATIONS

European Search Report re EP 98 63 0015.

*Primary Examiner*—Leo P. Picard
*Assistant Examiner*—Anatoly Vortman

(57) ABSTRACT

A thermal switch having a current carrying switch blade actuator of shape memory metal has a resistance less than 20 milliohms and a contact force greater than 150 grams. The actuator is deformed to less than about 8% strain, and a very hard high strength dielectric material is used for a spacer.

16 Claims, 4 Drawing Sheets

U.S. PATENT DOCUMENTS

| | | | |
|---|---|---|---|
| 3,033,958 | * 5/1962 | Wells, et al. | 337/112 |
| 3,213,250 | 10/1965 | Marcoux . | |
| 3,243,554 | * 3/1966 | Malone | 337/42 |
| 3,430,177 | * 2/1969 | Audette | 337/365 |
| 3,474,372 | 10/1969 | Davenport et al. . | |
| 3,707,694 | 12/1972 | DuRocher . | |
| 3,801,944 | 4/1974 | Brown . | |
| 4,035,552 | * 7/1977 | Epstein . | |
| 4,188,460 | * 2/1980 | Kang et al. . | |
| 4,356,478 | * 10/1982 | Muggli et al. | 340/593 |
| 4,374,311 | * 2/1983 | Okahashi et al. | 200/269 |
| 4,395,694 | 7/1983 | Wehl . | |
| 4,503,131 | * 3/1985 | Baudrand | 428/672 |
| 4,774,151 | 9/1988 | Cuomo et al. . | |
| 4,782,318 | 11/1988 | Boulanger . | |
| 4,818,641 | 4/1989 | Ledenican . | |
| 4,855,195 | 8/1989 | Georgopoulos et al. . | |
| 4,975,341 | * 12/1990 | Tucholski et al. | 429/62 |
| 4,992,339 | * 2/1991 | Georgopoulos | 429/7 |
| 5,026,615 | * 6/1991 | Tucholski . | |
| 5,061,914 | * 10/1991 | Busch et al. | 337/140 |
| 5,159,307 | * 10/1992 | Wells et al. | 337/85 |
| 5,188,909 | 2/1993 | Pedicini . | |
| 5,206,622 | 4/1993 | Lattari | 337/89 |
| 5,268,664 | 12/1993 | Givler . | |
| 5,337,036 | 8/1994 | Kuczynski . | |
| 5,376,467 | 12/1994 | Abe et al. . | |
| 5,567,539 | 10/1996 | Takahashi et al. . | |
| 5,619,177 | * 4/1997 | Johnson et al. | 337/140 |
| 5,691,073 | 11/1997 | Vu et al. . | |
| 5,747,187 | 5/1998 | Byon . | |
| 5,750,277 | 5/1998 | Vu et al. . | |
| 5,766,790 | 6/1998 | Kameishi et al. . | |
| 5,766,793 | 6/1998 | Kameishi et al. . | |
| 5,844,464 | * 12/1998 | Kalapodis et al. | 337/140 |
| 5,879,832 | * 3/1999 | Vu et al. . | |

* cited by examiner

THERMAL SWITCH ASSEMBLY

This application is a continuation-in-part of U.S. application Ser. No. 08/850,082, filed May 2, 1997, which in turn is a continuation-in-part of U.S. application Ser. No. 08/977,077, filed Nov. 24, 1997.

BACKGROUND OF THE INVENTION

This application relates to the art of thermal switches and, more particularly, to thermal switches that use a contact member of temperature sensitive shape memory alloy for making and breaking a circuit. The thermal switch of the present invention is particularly applicable for use in batteries and will be described with specific reference thereto. However, it will be appreciated that the invention has broader aspects and can be used in other devices.

Shape memory alloys can be used to replace bimetals in thermal switches. A switch contact arm of shape memory alloy has a deformed shape at normal temperatures and changes to a recovered shape at elevated temperatures. These changes in shape of a shape memory alloy contact arm provide different contact arm positions that can be used to open and close an electrical circuit.

Electrical switch components of shape memory alloy have been incorporated in batteries to open the battery circuit when the battery overheats. It is difficult to incorporate a switch component of shape memory alloy into the battery construction in a manner that provides reliable operation and protects the shape memory alloy from the corrosive battery environment. Therefore, it would be desirable to have a self-contained unitary sealed thermal switch assembly that can be used with batteries and other devices in a convenient and reliable manner.

Thermal switches for use in preventing thermal runaway in batteries must have a very low resistance so they will not be too wasteful of energy during normal charging and discharging of the battery. It is difficult to achieve low resistance with a current carrying actuator of shape memory metal. For protecting batteries against thermal runaway, it also is desirable that the protective switch function as a one-shot fuse that will not reclose once it has opened.

SUMMARY OF THE INVENTION

A self-contained sealed thermal switch assembly includes a contact member of shape memory alloy sandwiched between a pair of electrically conductive metal outer members. The contact member has a contact arm that completes or opens a current path between the pair of outer members by changing between a deformed shape at normal temperatures and a recovered shape at an elevated temperature.

In accordance with one important aspect of the present application, a switch with a current carrying actuator of shape memory metal that responds to an overcurrent or overtemperature condition has a resistance less than 20 milliohms, more preferably less than 12 milliohms and most preferably less than about 5–7 milliohms.

In accordance with another aspect of the application, a current carrying actuator of shape memory metal has a closed position engaging a fixed contact with a high contact force of at least 150 grams.

In accordance with another aspect of the application, a switch with the above characteristics has a continuous current rating of at least three amps at a temperature of 15–32° C.

In a preferred arrangement, the current carrying actuator of shape memory metal has an end edge that makes line contact with a fixed contact surface in the closed position of the switch.

In accordance with another aspect of the application, a switch having a current carrying actuator of shape memory metal operates as a one-shot fuse by moving to a switch open position at an elevated temperature and remaining open even though the temperature returns to normal.

In accordance with another arrangement, a switch having a current carrying actuator of shape memory metal includes an improved dielectric spacer sandwiched with an actuator mounting portion between a pair of metal plates. The spacer is a very hard electrical insulating material with high tensile strength, low water absorption and a high heat deflection temperature.

In a preferred arrangement for a one-shot switch, the current carrying actuator of shape memory metal is deformed to a strain that is less than 8% and most preferably not greater than about 4%.

In part, low resistance is obtained by coating all current carrying metal parts of the switch, including both outer and peripheral surfaces thereof, with a precious metal.

In one arrangement, the contact member of shape memory alloy is substantially E-shaped in plan view, and the elongated contact arm is defined by the center leg of the E.

In accordance with a preferred arrangement, the peripheral portion of the contact member is circumferentially interrupted so that its circumferential extent is substantially less than 360° but at least 270°.

An electrical insulator is positioned between a peripheral portion of the contact member and one of the outer members. The contact arm engages the one outer member when it is in its deformed shape at normal temperatures, and moves out of engagement with the one outer member when it is in its recovered shape at an elevated temperature.

In one arrangement, the pair of outer members have a cavity therebetween in which the elongated contact arm is located, and the one outer member has a depression therein facing the cavity.

The outer members have outwardly extending circumferential flanges surrounded by a sealing ring of electrical insulating material. A metal clamping ring surrounds the sealing ring and is crimped over the flanges on the outer members for holding same together while firmly compressing the sealing ring against the flanges to seal the cavity.

In one arrangement, the pair of outer members include a cap member and a base member. The base member is of aluminum and the cap member is of cold rolled steel that is plated with a precious metal.

It is a principal object of the present invention to provide a switch having a current carrying actuator of shape memory metal with a very low resistance.

It is a further object of the invention to provide such a switch that does not reclose once it has opened so that it operates as a one-shot fuse.

It is an additional object of the invention to provide such a switch with a dielectric spacer that is very hard, has a high tensile strength, low water absorption and a high heat deflection temperature.

It is another object of the present invention to provide a self-contained sealed thermal switch assembly that has a contact member of shape memory alloy.

It is also an object of the invention to provide a unitary thermal switch assembly that can be attached to batteries and other devices.

It is a further object of the invention to provide a thermal switch assembly of the type described that is reliable in operation and relatively easy to manufacture and assemble.

DESCRIPTION OF A PREFERRED EMBODIMENT

Figure 1:
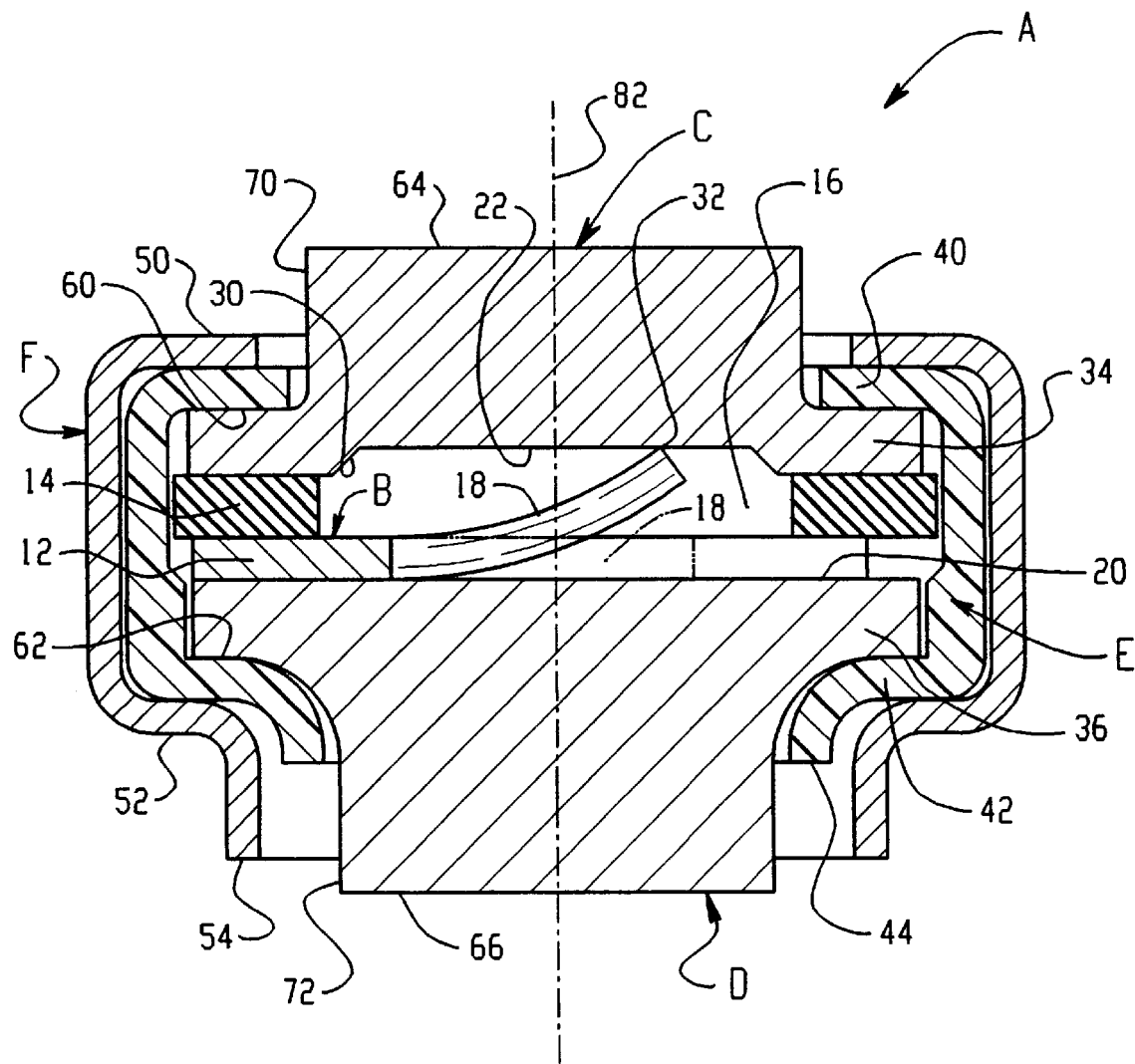
FIG. 1 is a cross-sectional elevational view of a self-contained sealed thermal switch assembly constructed in accordance with the present application.

Referring now to the drawing, wherein the showings are for purposes of illustrating a preferred embodiment of the invention only and not for purposes of limiting same, FIG. 1 shows a self-contained sealed thermal switch assembly A constructed in accordance with the present application.

A current carrying actuator and contact B of shape memory alloy has a peripheral portion 12 thereof sandwiched between a pair of electrically conductive metal outer members C and D that respectively are identified as cap and base members. A dielectric gasket ring or spacer 14 is positioned between cap member C and peripheral portion 12 of contact member B. Ring 14 preferably is a relatively hard material such as a liquid crystal polymer, although it will be appreciated that other materials can be used.

Dielectric spacer 14 preferably is of a relatively hard material that has a high tensile strength, low water absorption and a high heat deflection temperature. The material preferably has a tensile strength of at least 15,000 psi and more preferably at least 20,000 psi. The heat deflection temperature at 264 psi preferably is at least 500° F. The water absorption after 24 hours at 73° F. is preferably not greater than about 0.02%. Dielectric spacer 14 may be made of many different materials having these desirable properties and one example is glass filled polyphenylenesulfide. One suitable material is available from General Electric Company under the name SupecG410T. Another suitable material is available from RTP Co. under the name RTP1300 P-I series. Another material available from General Electric Company is Valox EF4530 PBTP Resin. All of these materials are glass reinforced and other materials having these desirable properties also are available.

A central cavity 16 between outer members C and D receives an elongated contact arm 18 extending inwardly from outer peripheral portion 12 of contact member B. Ann 18 also defines a current carrying actuator of shape memory metal. Base outer member D has a substantially flat or plane inner surface 20 facing cavity 16. Cap outer member C also has a substantially flat or plane inner surface 22 facing cavity 16. Inner surface 22 also defines the bottom of a cavity or depression 30 in cap member C that enlarges the vertical extent of cavity 16. Contact arm 18 has a terminal end 32 engaging inner surface 22 on cap member C to provide an electric current path between outer members C and D.

Outer members C and D have outwardly extending circumferential flanges 34 and 36 thereon to provide clamping surfaces for cooperation with a clamping ring, and are surrounded by a sealing ring E of electrical insulating material. Ring E preferably is of a relatively soft material that will deform and flow under load to provide a good seal. Polypropylene is one example of a material that can be used, although it will be appreciated that many other materials also would be satisfactory. Sealing ring E has inwardly extending upper and lower circumferential projections 40 and 42 that overlie flanges 34 and 36. Lower projection 42 extends inwardly and downwardly to terminate in a cylindrical portion 44.

A metal clamping ring F surrounds sealing ring E and has inwardly extending circumferential extensions 50 and 52 that respectively overlie outer surfaces of circumferential sealing projection 40 and flange 34, and circumferential sealing projection 42 and flange 36. Clamping ring extension 52 extends inwardly and downwardly to terminate in a cylindrical clamping ring portion 54.

Clamping ring F is crimped, along with its extensions 50 and 52, to compress sealing projections 40 and 42 against flanges 34 and 36 for providing a good seal between the surfaces generally indicated at 60 and 62. Insulating ring 14 and peripheral portion 12 of contact member B are held under compression by crimp ring F. Insulating ring 14 has a larger diameter than the outer periphery of contact member B, and of flanges 34 and 36. The outer periphery of ring 14 will engage sealing member E to prevent sliding movement of ring 14 relative to contact member B, and thereby prevent ring 14 from interfering with movement of switch arm 18.

Outer members C and D have substantially flat circular outer end surfaces 64 and 66 that are located axially outwardly from clamping ring F. Outer members C and D have cylindrical outer end portions 70 and 72, and cylindrical outer end portion 72 on base outer member D has a slightly smaller diameter than cylindrical outer end portion 70 on cap outer member C. Strictly by way of example and not by way of limitation, the diameter of cylindrical outer end portion 72 on base outer member D may be about 15–25 percent smaller than the diameter of cylindrical outer end portion 70 on cap outer member C.

Contact member B preferably is of a nickel-titanium shape memory alloy. However, it will be appreciated that other shape memory alloys can be used such as copper-based ternaries including copper-zinc-aluminum and copper-nickel-aluminum. The transition temperature range at which the alloy changes from its deformed shape to its recovered shape also can be varied significantly by selecting different shape memory alloy compositions and by varying heat treating processes.

Figure 2:
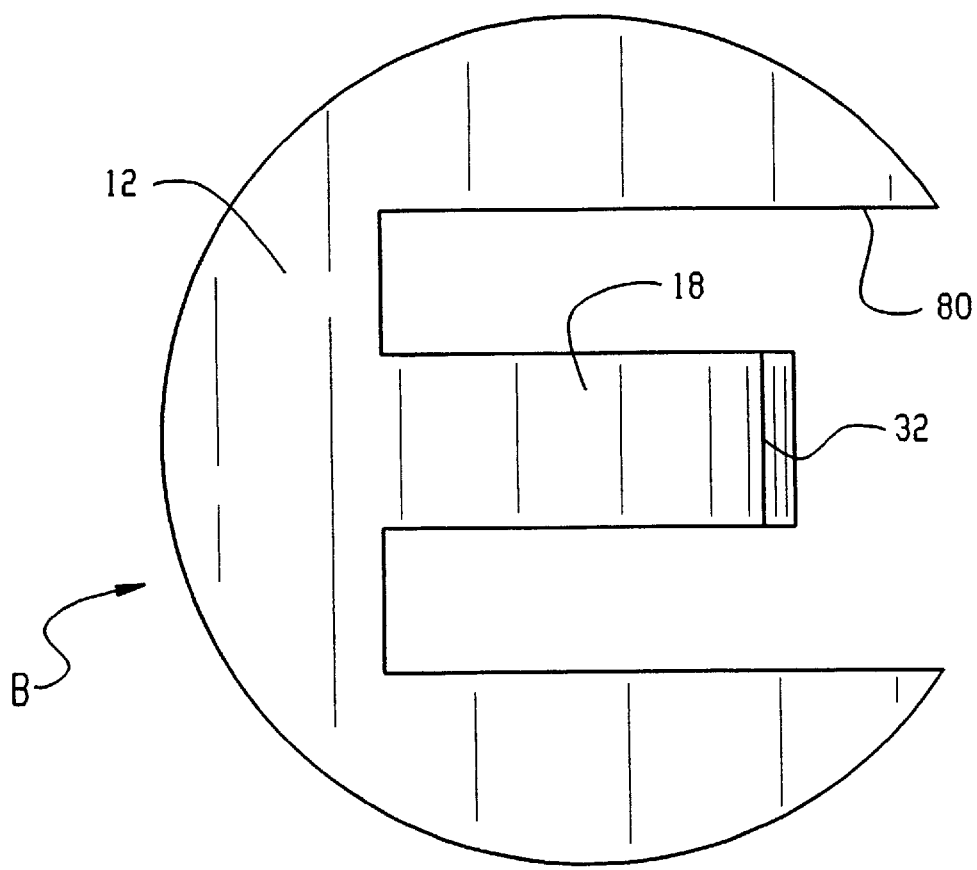
FIG. 2 is a plan view of a contact member used in the switch assembly of FIG. 1.

Contact member B is stamped and cut to its flat E-shaped configuration shown in FIG. 2, and is then heated to its austenitic transformation temperature. The contact member is then cooled to the martensitic state of the alloy, and current carrying contact arm actuator 18 is bent to a deformed shape having a desired configuration and position. This deformed shape is the one generally shown in FIG. 1, and the relaxed deformed shape of current carrying contact arm actuator 18 would have it extend above inner facing surface 22. Thus, current carrying contact arm actuator 18 is placed in bending stress when outer members C and D are clamped together so that terminal end 32 of contact arm 18 makes firm engagement with inner facing surface 22. In other words, the relaxed deformed position of contact arm 18 occupies a greater vertical distance than the distance between facing surfaces 20 and 22.

When the switch assembly is subjected to an elevated transformation temperature at which martensite changes to austenite, switch arm 18 reverts to its recovered shape shown generally in shadow line in FIG. 1. With a two-way design, contact arm actuator 18 upon cooling will revert to its solid line deformed shape reestablishing electrical continuity between outer members C and D. With a preferred one-way contact material in accordance with the present application, the contact arm remains in the recovered shape upon cooling to function as a one-shot fuse.

Shape memory alloys may be selected to have a large range of transformation or transition temperatures. The alloy selected is one that has a transition temperature approximating that of the over temperature condition to be protected against. For use in batteries, examples of transformation temperatures of alloys that have been tested, plus or minus 5°, include 62° C., 73° C. and 82° C. These examples would have transformation temperature ranges of approximately 57–67° C., 58–78° C. and 77–87° C. It will be recognized that a wide range of alloys and transformation temperatures may be chosen depending upon the application for the thermal switch assembly. The switch can be fabricated to open at an elevated temperature in the range of about 60–125° C. A preferred range is about 65–75° C.

In the battery application, the switch normally is closed and opens at an elevated or transformation temperature. It will be recognized that it is possible to arrange the thermal switch assembly for use in fire alarms or the like so that a circuit would be made instead of broken upon subjecting the switch assembly to an elevated transformation temperature. The contact member then would provide an open circuit in its deformed shape and a complete circuit in its recovered shape.

FIG. 2 shows contact member B as being substantially E-shaped in plan view. Elongated contact arm 18 is the center leg of the E and is shorter than the outer legs. Outer peripheral portion 12 of contact member B is circumferentially interrupted opposite terminal end portion 32 of contact arm 18. The circumferential interruption is generally indicated at 80 and is shown extending over an arc of about 60°. The circumferential interruption may be in the range of 30–90° so that circular peripheral portion 12 extends substantially less than 360° but at least 270°. This physical characteristic facilitates stamping and forming of contact member B, and provides reliable operation after assembly.

With reference to FIG. 1, current carrying contact arm actuator 18 extends substantially radially of central longitudinal axis 82 of switch assembly A. Contact arm 18 intersects and extends through axis 82. Contact arm 18 extends in one radial direction toward terminal end portion 32 from axis 82 and extends in an opposite radial direction from axis 82 toward its connection with peripheral portion 12. That portion of contact arm 18 that extends from axis 82 to terminal end portion 32 is longer than that portion of contact arm 18 that extends from axis 82 to the connection with peripheral portion 12.

When contact arm 18 is said to have a deformed shape and a recovered shape, it does not necessarily mean that the contact arm is deformed as shown in FIG. 1. For example, contact arm 18 could be bent upwardly before contact member B is heated to its austenite transformation temperature and bent back down into the plane of peripheral portion 12 after cooling. In such an arrangement, the upwardly curved position shown for contact arm 18 in FIG. 1 would be the recovered shape and a position lying substantially flat in the plane of peripheral portion 12 would be the deformed shape. The deformed shape simply is the shape assumed by the alloy in its martensitic state, and the recovered shape is the shape assumed by the alloy in its austenitic state.

Figure 4:
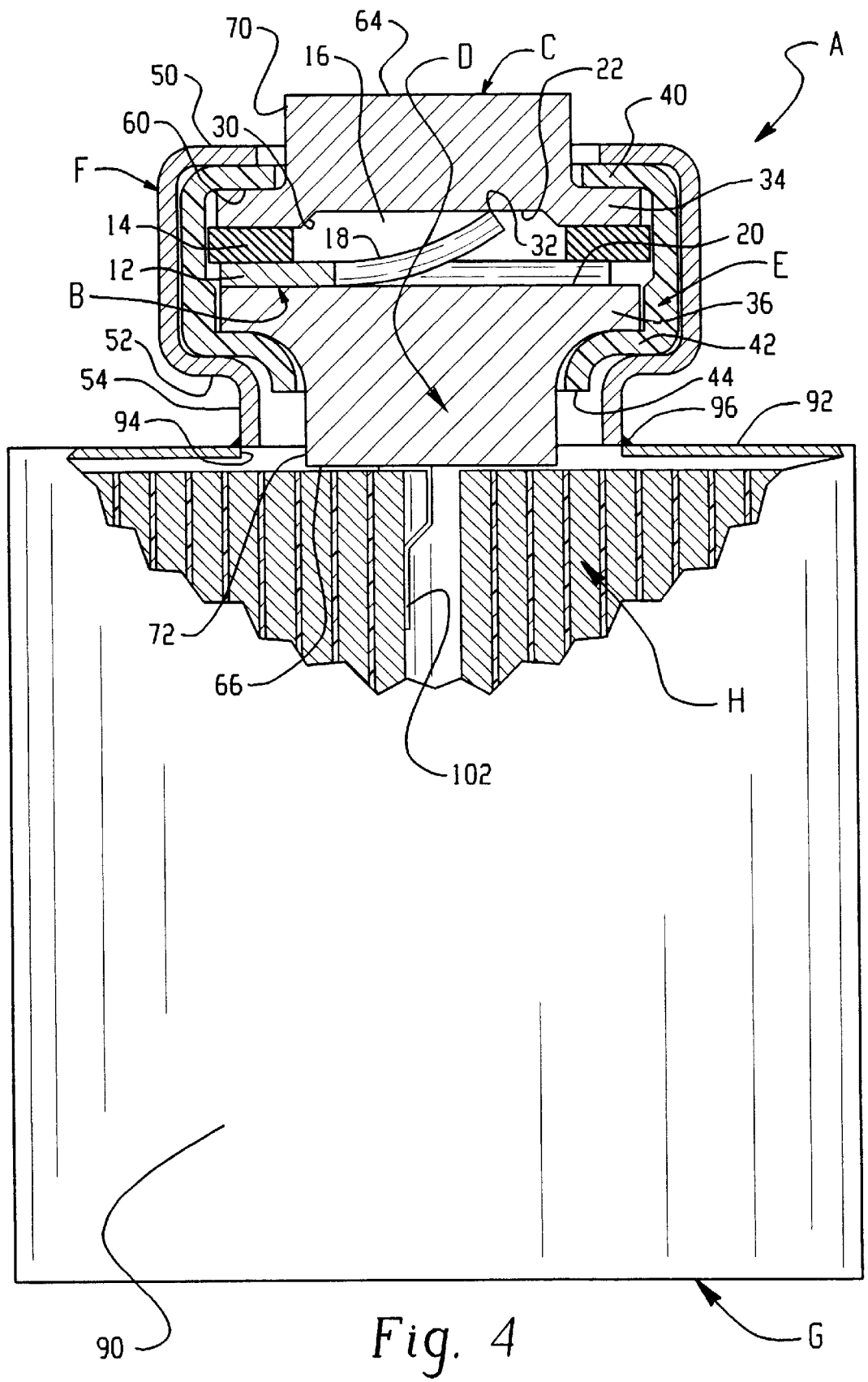
FIG. 4 is a side elevational view of a battery having the switch assembly installed thereon, and with portions cutaway and in section for clarity of illustration.

FIG. 4 shows a battery G having an aluminum case 90 and an aluminum lid 92 welded thereto. A cylindrical hole 94 in lid 92 has a diameter approximately the same as the outer diameter of cylindrical end portion 54 on clamping ring F. Lid 92 and switch assembly A are held in fixtures with the terminal end surface of clamping ring cylindrical portion 54 substantially flush with the outer surface of lid 92 in the position shown in FIG. 4. A laser weld generally indicated at 96 is then applied around the entire circumference of clamping ring cylindrical portion 54 for welding same to lid 92. A wire 102 is welded to end surface 66 of base outer member D. The assembled lid and switch assembly are then positioned as shown in FIG. 4 on battery case 90. Lid 92 is then peripherally laser welded to case 90 with wire 102 projecting down into a wrapped multi-layer assembly H that forms the battery electrodes.

The switch assembly of the present application is particularly advantageous for use with lithium ion electrochemical cells. One example of such a cell is described in U.S. Pat. No. 3,939,011, the disclosure of which is hereby incorporated herein by reference. Obviously, the improvements of the present application can be used in other types of lithium ion batteries as well as in other non-lithium batteries. A battery may overheat and present a danger of explosion when it is subjected to extremely rapid charging or discharging over prolonged periods of time or by reversing polarity when recharging. The improved thermal switch assembly of the present application interrupts charging or discharging to minimize the possibility of an explosion in response to an overcurrent condition or when the battery reaches an elevated temperature.

Clamping ring F preferably is nickel plated steel. Base outer member D is aluminum to better withstand a corrosive environment of the battery interior. Contact member B, including its opposite surfaces and its peripheral surface, preferably is plated with a precious metal such as silver or gold. Cap outer member C is of cold rolled steel and its entire surface, especially outer end 64 and inner surface 22, is plated with a precious metal such as silver or gold. For low resistivity, the entire outer surface of base member D also is coated with a precious metal. It will be recognized that other metals and plating metals can be used depending upon the application for the thermal switch assembly. For some applications where higher resistance can be tolerated, plating can be omitted.

Figure 3:
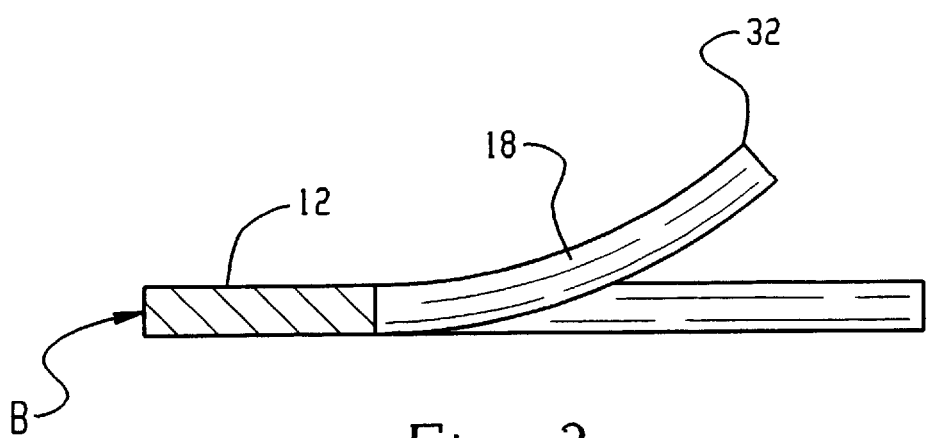
FIG. 3 is a side elevational view of the contact member of FIG. 2.
Figure 5:
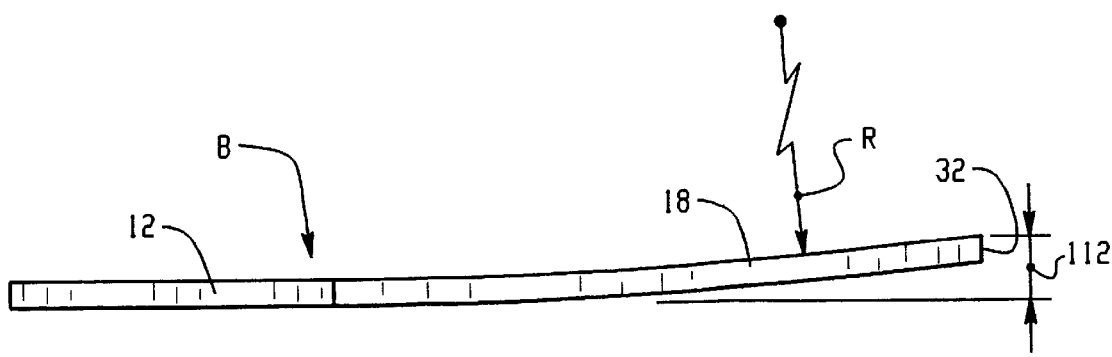
FIG. 5 is a side elevational view of a switch blade member.

Contact member 10 of shape memory metal is stamped and cut to a flat configuration and is then heated to its austenitic transformation temperature followed by cooling to its martensitic temperature. Switch blade actuator portion 18 then is bent to a permanently deformed position relative to mounting portion 12 as shown in FIGS. 3 and 5. With switch blade actuator portion 18 deformed as shown in FIG. 5, it is under approximately 4% strain as determined by the formula $e=1/[(2R/t)+1]$, where e is the percent strain, R is the radius of curvature for switch blade actuator portion 18 as shown in FIG. 5 and t is the thickness of switch blade portion 18. The amount of bending strain preferably is less than about 8% and most preferably less than about 4%. It will be recognized that this is an approximation for the amount of strain that is in switch blade portion 18.

The limit on the percent strain is desirable so that the switch will not reclose once it opens. Although the switch blade member can be heat treated and deformed so that it will return to its closed position upon cooling, it is preferred in accordance with the present application to have a switch blade member that remains open even after cooling. Thus, when the switch blade portion moves from a closed position to an open position in response to an elevated temperature condition, it remains open even after the elevated temperature condition no longer exists. If the switch blade portion is deformed beyond the percent strain indicated, it will cause permanent yield of metal beyond the elastic limit which may cause it to return to its closed position upon cooling. Thus, a switch that may reclose upon cooling can be obtained if so desired by initially bending the switch blade actuator to greater than about 8% strain.

Figure 6:
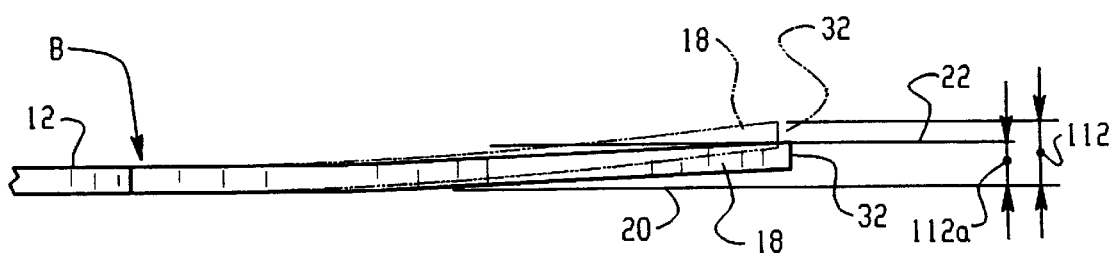
FIG. 6 is a side elevational view of the switch blade member under bending stress between a pair of metal plates.

The vertical extent of switch blade arm 18 in its deformed martensitic state is indicated at 112 in FIG. 5. This vertical height is reduced when the switch blade member is sandwiched between metal members C, D. In order to ensure good contact between inner surface 22 of metal member C and the end 32 of switch blade actuator portion 18, vertical height 112 preferably is reduced by at least 15%, more preferably at least 20% and most preferably at least 25%. Although greater reductions in this vertical distance are possible, the maximum preferably is not greater than about 40% or such as to cause yielding of the metal. FIG. 6 shows switch blade actuator portion 18 under bending stress between surfaces 20, 22 with a reduced vertical height 112a. By way of example, if height 112 is about 45–55 thousandths of an inch, height 112a is about 8–12 thousandths of an inch smaller. At the reduced vertical height 112a. the end edge of blade 18 engages fixed contact surface 22 with a contact force of at least 150 grams. This high contact force aids in maintaining a very low resistance for the switch in its closed position and helps to enable the desired continuous current rating.

The contact force is measured by using an Instron load and tensile testing instrument. The instrument probe is placed on the upper end edge of blade 18 when the blade is in its deformed condition at height 112 in FIG. 6. Downward force is then applied to the probe to move the blade to the position that it will occupy between surfaces 20, 22 at height 112a. The force is then read using the test instrument and should be greater than 150 grams. The length, width and thickness of blade 18, along with the physical properties of the shape memory metal, are selected to provide a contact force greater than 150 grams in the closed position of the switch.

Figure 7:
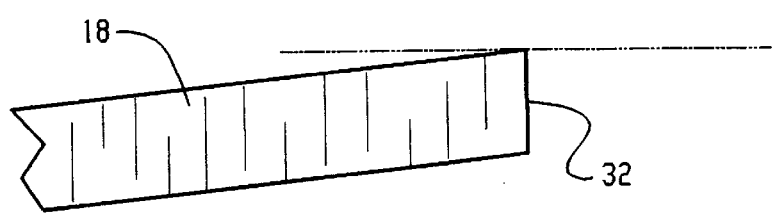
FIG. 7 is an enlarged side elevational view of an end portion of a switch blade.
Figure 8:
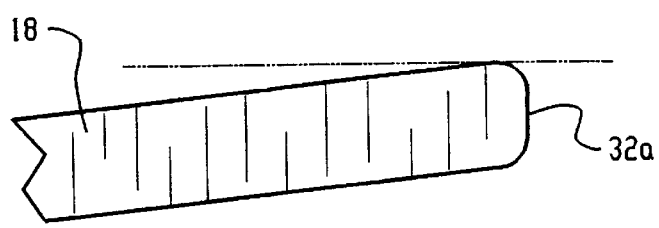
FIG. 8 is an enlarged side elevational view of a modified end portion of a switch blade.

FIG. 7 shows end 32 of switch blade actuator portion 18 as having a relatively sharp edge at the intersection of the upper surface of the blade portion with the blade end. This edge makes substantially line contact with inner surface 22 of metal member C in the switch closed position. FIG. 8 shows a rounded end 32a that still will make essentially line contact with inner surface 22 of metal member C. Although many other end shapes may be provided, they essentially will make line contact with the inner surface of the metal plate. The line of engagement is between precious metal coatings on both the blade and the inner plate surface. The length of the line contact between the upper end edge of blade 18 and fixed contact surface 22 may be less than the width of the blade for a variety of reasons. For example, the blade may be slightly twisted or the end edge may not be perfectly square with the blade longitudinal axis so that the line of engagement is along a portion of the upper end edge adjacent one or the other side of the blade. The end portion of the blade may also be made with a reduced width so that the upper end edge of the blade has a length that is less than the blade width. A minimum contact force of 150 grams combined with line contact provides a very high force per unit of area because a line contact has minimal area.

The heat that causes the switch to open may be from $I^2R$ heating, by conduction from the battery case and terminal, by convection from the environment in which the switch is installed, or from a combination of these. Reference to a thermal switch encompasses switches that respond to any one or more of these heat sources.

In the present application, the current carrying actuator and contact of shape memory metal defined by switch blade actuator portion 18 is in its martensitic deformed shape in the switch closed position. At the elevated operating temperature, the switch blade portion assumes its austenitic recovered shape and moves to a switch open position. Upon cooling, the switch blade portion does not move back to its closed position so that the switch assembly functions as a one-way fuse. This is achieved principally by controlling the percent strain in the current carrying switchblade actuator in its deformed shape. Although the shape memory metal can be processed so that the switch would reclose upon cooling and the present application covers such arrangements, the most preferred arrangement is one in which the actuator does not fully return to its deformed shape from its recovered shape upon cooling.

All of the current carrying metal parts of the switch assembly preferably are plated with a precious metal such as silver, gold, platinum or palladium to provide good electrical conductivity. The plating is provided on both opposite surfaces and peripheral surfaces of the current currying metal parts C, D and the contact member B. It will be recognized that the precious metal coating could be applied in ways other than electroplating, such as by vacuum deposition or sputtering. Although it is preferred to coat the entire outer surfaces of the current carrying metal parts with a precious metal, it will be understood that localized coating of small areas may be possible for some applications.

For optimum conductivity and low resistance, outer metal parts C, D may be of brass or copper and to minimize corrosion in the event the precious metal coating is nicked, scratched or otherwise broken.

One prototype switch assembly using the principles of the present application had a resistivity less than about 5 milliohms. In accordance with the present application the switch assembly preferably has a resistivity less than 20 milliohms, more preferably less than about 12 milliohms and most preferably not greater than about 5 or 6 milliohms. The extremely low resistivity is achieved by a combination of features that include coating all metal surfaces of current carrying metal parts with a precious metal, assembling the switch under sufficient compression to insure good engagement between the mounting portion of the contact member and the inner surface of a metal plate, and providing a switch blade actuator with sufficient stiffness and placing it in sufficient bending stress to insure good contact between the outer end of the blade and the inner surface of the outer plate.

Although the switch assembly has been shown and described with respect to a normally closed arrangement, it will be recognized that normally open switches can be constructed by using features of the present application. The switch assembly can be used in other temperature monitoring applications to open a circuit or to close a circuit and sound an alarm. For example, a normally open switch arrangement could be used in fire alarms and would move to a switch closed position in response to an elevated temperature to sound an audible signal.

The improved switch assembly of the present application enables miniaturization and examples of dimensions will be given simply by way of illustration. Contact member B has a diameter of about 0.183 inch and a thickness of about 0.01 inch. Switch blade actuator portion 18 has a length of about 0.092 inch and a width of about 0.036 inch. Switch blade actuators in accordance with the present application have a length less than about 0.20 inch, preferably less than about 0.15 inch and more preferably not greater than about 0.10 inch. The actuator has a thickness less than about 0.02 inch, more preferably less than about 0.015 inch and most preferably not greater than about 0.010 inch. These dimensions may be increased by a couple of thousandths of an inch by the thickness of the precious metal plating. The length of blade 18 that forms the current carrying actuator is measured from where it is attached to base or peripheral portion 12 of contact B to the free end of the blade. Obviously, the principles of the present application may also be used with dimensions outside of these ranges for some purposes.

Switches in accordance with the present application can be made with blades having a greater width and length to provide an even lower resistance and an even higher continuous current rating. For example, a switch has been made with a blade length of about 0.200 inch and a blade width of about 0.118 inch. The blade thickness remained about 0.010 inch. This switch has a resistance less than 0.5 milliohm and a continuous current rating of 20 amps at a temperature of 15–35° C. The switch was otherwise constructed substantially the same as the previous example including a precious metal plating on all surfaces and a contact force greater than 150 grams.

The thickness of the blade preferably remains less than 0.020 inch, more preferably less than 0.015 inch, and most preferably less than about 0.010 inch, with these numbers increased by the plating thickness of about 0.001–0.002 inch. If the thickness is increased, the shape memory material does not react as well. For example, the material does not move as quickly at the transformation temperature. Thicker material also is less stable because the thicker material tends to plastically deform when the blade is bent to its desired radius. Thicker material also is less economical.

The improved self-contained switch assembly of the present application need not be sealed for use in non-corrosive environments. The switch assembly also can be held together in other ways. The important features are that the mounting portion of the current carrying shape memory actuator and the dielectric spacer are sandwiched under compression between a pair of outer metal plates. Compression is desirable so that the mounting portion of the current carrying shape memory actuator makes optimum electrical contact with the inner surface of the metal plate with which it is engaged. For low conductivity, all outer surfaces of current carrying parts of the switch, including peripheral surfaces, are coated with a precious metal. The current carrying shape memory actuator has a height in its deformed shape as shown at 112 in FIGS. 5 and 6 that is substantially greater than the distance between the inner surfaces of the opposite metal plates. This places the actuator under significant bending stress when the switch is assembled so that its end makes good electrical contact with the one plate and provides a contact force greater than 150 grams. When the terms about or substantially are used in this application, it means plus or minus 10% unless otherwise indicated or understood from the context in which it is used.

The dimensions of the blade may vary considerably depending on the application for the switch. For a miniature switch having a continuous current rating up to about 3 amps, the blade length is less than about 0.120 inch and the width is less than about 0.050 inch. More preferably, the length is less than about 0.100 inch and the width less than about 0.040 inch. The blade thickness is less than 0.020 inch, more preferably less than 0.015 inch and most preferably less than about 0.010 inch. The resistance of the closed switch is less than 20 milliohms, more preferably less than about 12 milliohms, and most preferably not greater than about 5 or 6 milliohms. The contact force is greater than 150 grams. For slightly larger miniature switches having a continuous current rating up to 20 amps, the blade length is less than about 0.250 inch and more preferably less than about 0.225 inch. The width is less than about 0.150 inch and more preferably less than about 0.130 inch. The blade thickness is less than 0.020 inch, more preferably less than 0.015 inch, and most preferably less than about 0.010 inch. The resistance of the closed switch is less than 3 milliohms, more preferably less than 2 milliohms, and most preferably less than 1 milliohm. The contact force is greater than 150 grams. Line contact and plating on all surfaces, including the periphery of the blade, are important features in all embodiments. Plating on only the opposite surfaces of the blade means that current flows through the material of the blade itself and that material has a much higher resistance than the precious metal plating. Providing the precious metal plating on the periphery of the blade as well provides current carrying capability through the precious metal from the top to the bottom of the blade through the peripheral plating.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

What is claimed is:

1. A thermal switch including a current carrying actuator blade of shape memory metal having a blade end engaging a fixed contact surface with a contact force of at least 150 grams, said blade having top and bottom surfaces and a peripheral surface plated with a precious metal so that current is carried from the precious metal plating on the top surface to the precious metal plating on the bottom surface through the precious metal plating on the blade peripheral surface.

2. The switch of claim 1 wherein said blade has a length not greater than 0.250 inch and a width not greater than 0.140 inch.

3. The switch of claim 1 wherein said blade has a thickness not greater than 0.020 inch.

4. The switch of claim 1 wherein said switch has a resistance less than about 3 milliohms.

5. The switch of claim 1 wherein said blade has a length not greater than 0.150 inch and a width not greater than 0.050 inch.

6. The switch of claim 1 wherein said switch has a resistance less than about 10 milliohms.

7. The switch of claim 1 wherein said blade end has a blade end edge engaging said fixed contact surface with line contact.

8. The thermal switch of claim 1 wherein said shape memory metal has a deformed state in which it is under less than about 8% strain.

9. The switch of claim 8 wherein said strain is less than about 5%.

10. The switch of claim 8 wherein said switch blade actuator has a normally closed position and is movable to an open position responsive to an elevated temperature.

11. The switch of claim 10 wherein said switch blade actuator functions as a one-shot fuse by remaining in said open position after lowering of the elevated temperature.

12. The switch of claim 8 wherein said switch blade actuator has a fixed mounting portion and a movable portion and said movable portion has a length not greater than about 0.30 inch.

13. A thermal switch including a current carrying actuator blade of a shape memory metal having a blade end engaging a fixed contact surface with a contact force of at least 150 grams, said switch having a resistance not greater than 20 milliohms, said blade having a thickness less than 0.020 inch, said blade having top and bottom surfaces and a peripheral surface coated with a precious metal, and said blade having a deformed state in which it is under less than about 8% strain.

14. The switch of claim 13 wherein said blade has a blade end edge engaging said fixed contact surface with line contact.

15. The switch of claim 13 including a pair of plates, one of said plates having said fixed contact surface thereon, said blade having a base portion, a dielectric spacer between said one plate and said base, said base being in engagement with the other of said plates, and said spacer and said base being under compression between said plates.

16. The switch of claim 13 wherein said resistance is not greater than 12 milliohms.

* * * * *

UNITED STATES PATENT AND TRADEMARK OFFICE
CERTIFICATE OF CORRECTION

PATENT NO. : 6,191,679 B1
DATED : February 20, 2001
INVENTOR(S) : James B. Kalapodis et al.

Page 1 of 1

It is certified that error appears in the above-identified patent and that said Letters Patent is hereby corrected as shown below:

<u>Title page,</u>
Under "Assignee", "Thermo-O-Disc" should be -- Therm-O-Disc --.

Under "FOREIGN PATENT DOCUMENTS", (second reference listed), delete "0689255A2   12/1995   (EP) ............ H01M/2/12"

<u>Column 3,</u>
Line 1, "DRAWING" should be -- DRAWINGS --.
Line 24, "drawing" should be -- drawings --.
Line 58, "Ann" should be -- Arm --

<u>Column 8,</u>
Line 29, "currying" should be -- carrying --.

Signed and Sealed this

Twenty-sixth Day of March, 2002

*Attest:*

JAMES E. ROGAN
*Attesting Officer*          *Director of the United States Patent and Trademark Office*